(12) United States Patent
Miyazaki

(10) Patent No.: US 10,126,573 B2
(45) Date of Patent: Nov. 13, 2018

(54) OPTICAL-WAVEGUIDE-ELEMENT MODULE

(71) Applicant: Sumitomo Osaka Cement Co., Ltd, Tokyo (JP)

(72) Inventor: Norikazu Miyazaki, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/126,747

(22) PCT Filed: Jan. 7, 2015

(86) PCT No.: PCT/JP2015/050212
§ 371 (c)(1),
(2) Date: Sep. 16, 2016

(87) PCT Pub. No.: WO2015/151536
PCT Pub. Date: Oct. 8, 2015

(65) Prior Publication Data
US 2017/0219851 A1   Aug. 3, 2017

(30) Foreign Application Priority Data

Mar. 31, 2014 (JP) ................................. 2014-073458

(51) Int. Cl.
*G02F 1/035* (2006.01)
*G02F 1/225* (2006.01)
(Continued)

(52) U.S. Cl.
CPC .............. *G02F 1/035* (2013.01); *G02F 1/011* (2013.01); *G02F 1/0356* (2013.01); *G02F 1/225* (2013.01);
(Continued)

(58) Field of Classification Search
CPC . G02F 1/03; G02F 1/011; G02F 1/065; G02F 1/225; G02F 1/2255; G02F 1/035;
(Continued)

(56) References Cited

U.S. PATENT DOCUMENTS 6,259,337 B1   7/2001   Wen
6,552,837 B2 *  4/2003   Mirshekar-Syahkal .....................
                                                    G02F 1/0327
                                                    359/245

(Continued)

FOREIGN PATENT DOCUMENTS

JP   2003-233043    *  8/2003   ............... G02F 1/03
JP   2003233043 A      8/2003
JP   2011209456 A     10/2011

OTHER PUBLICATIONS

International Search Report of PCT/JP2015/050212 dated Mar. 24, 2015.

*Primary Examiner* — Robert Tavlykaev
(74) *Attorney, Agent, or Firm* — Taft Stettinius & Hollister LLP

(57) ABSTRACT

Provided is an optical-waveguide-element module in which a common connecting substrate is used for different optical waveguide elements and deterioration of the propagation characteristics of electrical signals in a curved section of a signal electrode is suppressed. A control electrode in an optical waveguide element is consisted of a signal electrode SL and ground electrodes GD which put the signal electrode therebetween, a connecting substrate is provided with a signal line SL1 (SL2) and ground lines GD1 (GD2) which put the signal line therebetween, the signal electrode and the signal line, and, the ground electrodes and the ground lines are respectively connected to each other using wires (WR1, WR2, and WR20 to WR22), the control electrode in which a space W1 between the ground electrodes GD at an input (Continued)

end or an output end of the control electrode is wider than a space W2 between the ground lines GD1 (GD2) on the optical waveguide element side in the connecting substrate, has a portion in which the space between the ground electrodes GD forms a space W3 which is narrower than the space W2 in a portion away from the input end or the output end, furthermore, the signal electrode SL in the control electrode has a curved section in a place from the input end or the output end to an operating part in which the control electrode applies an electric field to the optical waveguide, and suppression means (WR20 to WR32) for suppressing generation of a local potential difference between the ground electrodes which put the signal electrode therebetween in the curved section of the signal electrode is provided.

3 Claims, 3 Drawing Sheets

(51) Int. Cl.
*G02F 1/01* (2006.01)
*G02F 1/21* (2006.01)
*G02F 1/03* (2006.01)

(52) U.S. Cl.
CPC .......... *G02F 1/2255* (2013.01); *G02F 1/0316* (2013.01); *G02F 2001/212* (2013.01); *G02F 2201/12* (2013.01); *G02F 2201/127* (2013.01)

(58) Field of Classification Search
CPC ............. G02F 1/0356; G02F 2001/212; G02F 2201/127
USPC .......................................................... 385/1–3
See application file for complete search history.

(56) References Cited

U.S. PATENT DOCUMENTS

| | | | |
|---|---|---|---|
| 6,678,428 B2* | 1/2004 | Seino .................... | G02F 1/2255 359/245 |
| 6,741,379 B2 | 5/2004 | Kaitoh et al. | |
| 6,937,790 B2* | 8/2005 | Bridges ................. | G02F 1/2255 385/30 |
| 6,980,706 B2* | 12/2005 | Sugiyama ............. | G02F 1/2255 385/2 |
| 7,751,656 B2* | 7/2010 | Sugiyama ............. | G02F 1/2255 359/251 |
| 8,218,914 B2* | 7/2012 | Kissa .................... | G02F 1/2255 385/2 |
| 8,411,349 B2* | 4/2013 | Mitomi ................. | G02F 1/2255 359/237 |
| 8,467,634 B2* | 6/2013 | Sugiyama ............... | G02F 1/225 385/2 |
| 9,075,254 B2 | 7/2015 | Takemura et al. | |
| 9,316,887 B2* | 4/2016 | Sugiyama ............. | G02F 1/2255 |
| 9,335,570 B2* | 5/2016 | Katou ................... | G02F 1/0121 |
| 2003/0151792 A1 | 8/2003 | Kaitoh et al. | |
| 2003/0151793 A1* | 8/2003 | Sugiyama ............. | G02F 1/0356 359/279 |
| 2006/0119448 A1 | 6/2006 | Lee et al. | |
| 2010/0067840 A1* | 3/2010 | Sugiyama ............. | G02F 1/0316 385/2 |
| 2011/0268382 A1* | 11/2011 | Takemura ............. | G02F 1/0316 385/2 |
| 2016/0054638 A1* | 2/2016 | Miyazaki .............. | G02F 1/0123 385/2 |
| 2017/0139240 A1* | 5/2017 | Katou .................... | G02F 1/035 |

\* cited by examiner

OPTICAL-WAVEGUIDE-ELEMENT MODULE

TECHNICAL FIELD

The present invention relates to an optical-waveguide-element module and particularly to an optical-waveguide-element module having an optical waveguide element and a connecting substrate housed in a package.

BACKGROUND ART

In optical measurement technical fields or optical communication technical fields, optical waveguide elements having optical waveguides formed in a substrate having an electro-optic effect such as optical modulator or optical switches are frequently used. Generally, these optical waveguide elements are housed in a package (case) to be sealed and configure an optical-waveguide-element module.

As described in Patent Literature No. 1, a relay substrate (a connecting substrate) for electrically connecting input lines from the outside to a control electrode in an optical waveguide element or a terminal substrate (a connecting substrate) which is electrically connected to the output side of the control electrode in the optical waveguide element and is intended to absorb or lead out output signals to the outside of a module is housed in the case of the optical-waveguide-element module.

Generally, in order to decrease discontinuity in a connecting portion and improve frequency characteristics, as illustrated in FIG. 1, a design is made to be the same electrode dimensions or the same spaces between ground electrodes (GND), between a substrate for modulation and the relay substrate (CP1) which constitute an optical waveguide element 1. It can be also applied to be the same as the above on connecting portion between the terminal substrate (CP2) and the substrate for modulation. When the dimensions or spaces of electrodes are matched to each other on the substrate for modulation and the connecting substrate as described above, it is necessary to prepare as many connecting substrates as the kinds of optical waveguide elements, which causes an increase in manufacturing costs.

In FIG. 1, as the optical waveguide element 1, optical waveguide, not illustrated, is formed on a substrate, and a control electrode constituted of a signal electrode SL and a ground electrode GD is provided in order to control light waves that propagate through the optical waveguides. Optical fibers (FB1 and FB2) are connected to the optical waveguide element 1, input light is introduced into the optical waveguide element 1, and furthermore, output light is led out.

A modulation signal IS is input using a connector CN1, and a modulation signal OS is led out using a connector CN2. A signal line SL1 and a ground line GD1 are formed in the relay substrate (connecting substrate) CP1, and a signal line SL2 and a ground line GD2 are also provided in the terminal substrate (connecting substrate) CP2.

The connector and the signal line on the connecting substrate, or, the connector and the ground line on the connecting substrate are electrically connected to each other directly or using wires RB such as gold ribbon or gold wire. Between the signal line on the connecting substrate and the signal electrode in the optical waveguide element or between the ground line on the connecting substrate and the ground electrode in the optical waveguide element are electrically connected to each other using wire RB such as gold wire.

The optical waveguide element 1 or the connecting substrates (CP1 and CP2) are housed in a metal case 2. The optical fibers (FB1 and FB2) or the connectors (CN1 and CN2) are disposed so as to penetrate through the case.

As the transmission rate (bandwidth) of optical waveguide element is progressed to be higher and wider, a material with lower permittivity than the substrate constituting optical waveguide elements (substrate for modulation) such as alumina has been used for the connecting substrate shown in FIG. 2. In addition, in order to prevent frequency characteristics from being deteriorated due to substrate mode or the like, the dimensions of connection portion in connecting substrates or the like become decreased. Therefore, when the space between ground electrodes or the space between ground lines are configured to be equal each other as in the related art, the signal electrode width in optical waveguide element becomes small, and the width of signal line in the connecting substrate becomes different from one in the substrate having an electro-optic effect such as $LiNbO_3$ or semiconductor substrate, and thus discontinuity of connecting portion is caused, and electrical characteristics are deteriorated. In addition, when the width of signal line or the space between ground lines abruptly change between the input side and the output side on the connecting substrate, impedance mismatch is likely to occur, and deterioration of electrical characteristics become more remarkable.

Furthermore, as illustrated in FIG. 2, in a case in which, in order to match the impedances among signal line outside the case, the connecting substrate and the optical waveguide element, the width S1 of the signal electrode SL in the optical waveguide element and the width S2 of the signal line SL1 (SL2) on the connecting substrate make different each other, and the space W1 between the ground electrodes GD in the optical waveguide element and the space W2 between the ground lines GD1 (GD2) on the connecting substrates make different each other, discontinuity of electric connection, for example, caused by differences of electric field intensities between signal portion and grounding portions on the connecting substrate, and, the optical waveguide element is caused, and deterioration of electric characteristics is occured.

In order to solve the above-described inconvenience, Patent Literature No. 2 makes effort about the disposition of wires electrically connecting between ground electrodes in optical waveguide element and ground lines on connecting substrate.

Meanwhile, the control electrode provided in the optical waveguide element has a number of curved sections from the relation with the arrangement of the signal electrodes. As illustrated in FIG. 2, the length from a point X1 (Y1) which is terminal ends of the ground line GD1 and the signal line SL1 on the connecting substrate to a starting point X2 (Y2) of an operating part in which the control electrode in the optical waveguide element applies an electric field to the optical waveguides along the signal electrode SL becomes a dotted line X(Y). As shown in FIG. 2, the lengths of the dotted line X and the dotted line Y are different each other. Particularly, since the distance from the point X1 to an point along the dotted line X in the curved section and the distance from a point Y1 to an point along the dotted line Y in the curved section are different each other in the respective ground electrodes which put the signal electrode therebetween, the propagation times of microwaves are different, and a local potential difference is occurred between the ground electrodes. Therefore, the propagation characteristics of electrical signals such as microwaves and the like are deteriorated.

Furthermore, in a case in which the space W1 between the ground electrodes which put the signal electrode in the optical waveguide element therebetween and the space W2 between the ground lines which put the signal line therebetween on the connecting substrate are different each other as in a case in which a common connecting substrate is used for different optical waveguide elements, not only including the above-described cause due to the curved section of the signal electrode, but the lengths of the ground electrodes along the signal electrode reaching to the operating part is also more likely to become different. Therefore, deterioration of the propagation characteristics of electrical signals becomes more significant.

CITATION LIST

Patent Literature

[Patent Literature No. 1] Japanese Laid-open Patent Publication No. 2003-233043
[Patent Literature No. 2] Japanese Laid-open Patent Publication No. 2011-209456

SUMMARY OF INVENTION

Technical Problem

An object of the present invention is to solve the above-described problems and provide an optical-waveguide-element module which enables a common connecting substrate to be used for different optical waveguide elements and suppresses deterioration of the propagation characteristics of electrical signals in a curved section of a signal electrode.

Solution to Problem

In order to solve the above-described problems, an optical-waveguide-element module of the present invention has the following technical characteristics.

(1) An optical-waveguide-element module including: an optical waveguide element including a substrate having an electro-optic effect, an optical waveguide formed in the substrate, and a control electrode for controlling light waves that propagate through the optical waveguide; and a connecting substrate which is provided outside the optical waveguide element and has a wire electrically connected to the control electrode, the optical waveguide element and the connecting substrate being housed in a case, in which the control electrode is consisted of a signal electrode and ground electrodes which put the signal electrode therebetween, the connecting substrate is provided with a signal line and ground lines which put the signal line therebetween, the signal electrode and the signal line and the ground electrodes and the ground lines are respectively connected each other using wires, the control electrode in which a space W1 between the ground electrodes at an input end or an output end of the control electrode is wider than a space W2 between the ground lines at the optical waveguide element side on the connecting substrate, has a portion in which the space between the ground electrodes forms a space W3 which is narrower than the space W2 in a portion away from the input end or the output end, furthermore, the signal electrode in the control electrode has a curved section in a place from the input end or the output end to an operating part in which the control electrode applies an electric field to the optical waveguide, and suppression means for suppressing generation of a local potential difference between the ground electrodes which put the signal electrode therebetween in the curved section of the signal electrode is provided.

(2) The optical-waveguide-element module according to (1), in which the suppression means is a plurality of wires connecting the ground electrodes which put the curved section of the signal electrode therebetween, and the respective wires connecting the ground electrodes are disposed in a normal direction to the curved section of the signal electrode.

(3) The optical-waveguide-element module according to (1), in which the suppression means is wires connecting the ground electrodes and the ground lines, and a length of the wire connected to the ground electrode having a longer length of the ground electrode along the signal electrode in a place from the input end or the output end to the operating part in which the control electrode applies an electric field to the optical waveguide is set to be longer than a length of the wire connected to the ground electrode having a shorter length.

(4) The optical-waveguide-element module according to (1), in which the suppression means is wires connecting the ground electrodes and the ground lines, and the wire connected to the ground electrode having a longer length of the ground electrode along the signal electrode in a place from the input end or the output end to the operating part in which the control electrode applies an electric field to the optical waveguide is disposed closer to the signal electrode than the wire connected to the ground electrode having a shorter length.

Advantageous Effects of Invention

According to the present invention, in an optical-waveguide-element module including an optical waveguide element including a substrate having an electro-optic effect, an optical waveguide formed in the substrate, and a control electrode for controlling light waves that propagate through the optical waveguide and a connecting substrate which is provided outside the optical waveguide element and has a wire electrically connected to the control electrode, the optical waveguide element and the connecting substrate being housed in a case, since the control electrode is consisted of a signal electrode and ground electrodes which put the signal electrode therebetween, the connecting substrate is provided with a signal line and ground lines which put the signal line therebetween, the signal electrode and the signal line, and, the ground electrodes and the ground lines are respectively connected each other using wires, the control electrode in which a space W1 between the ground electrodes at an input end or an output end in the control electrode is wider than a space W2 between the ground lines at the optical waveguide element side on the connecting substrate, has a portion in which the space between the ground electrodes forms a space W3 which is narrower than the space W2 in a portion away from the input end or the output end, furthermore, the signal electrode in the control electrode has a curved section in a place from the input end or the output end to an operating part in which the control electrode applies an electric field to the optical waveguide, and suppression means for suppressing generation of a local potential difference between the ground electrodes which put the signal electrode therebetween in the curved section of the signal electrode is provided so that it is possible to suppress deterioration of the propagation characteristics of electrical signals in the curved section, and furthermore, even in a case in which a common connecting substrate is used for different optical waveguide elements, it is possible to suppress deterioration of the propagation characteristics of electrical signals in the curved section. As a result, it becomes possible to realize favorable optical modulation in a broad bandwidth.

DESCRIPTION OF EMBODIMENTS

Hereinafter, an optical-waveguide-element module of the present invention will be described in detail using preferred examples.

Figure 1:
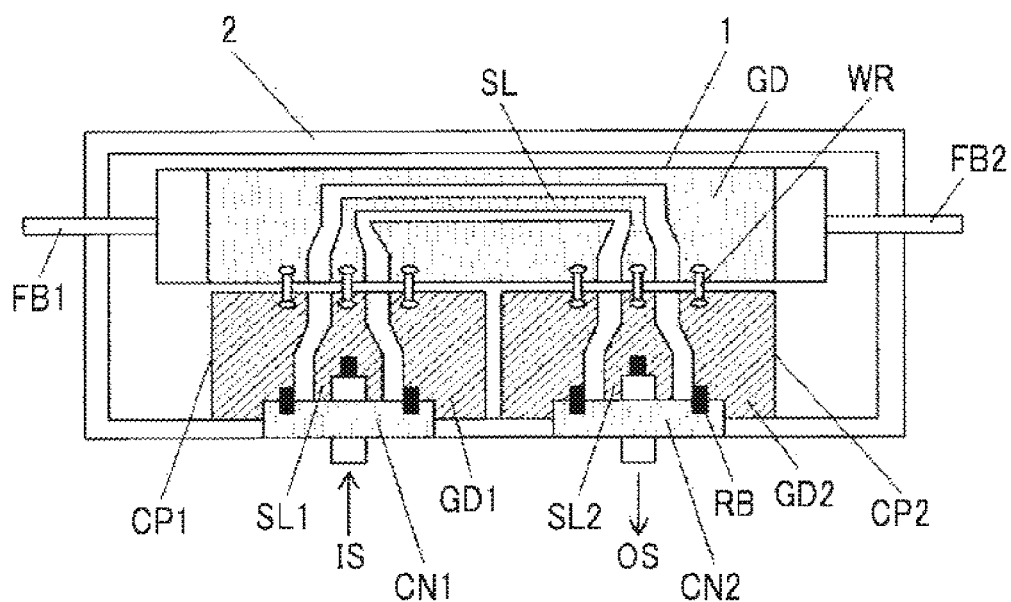
FIG. 1 is a view illustrating an optical-waveguide-element module of the related art.
Figure 2:
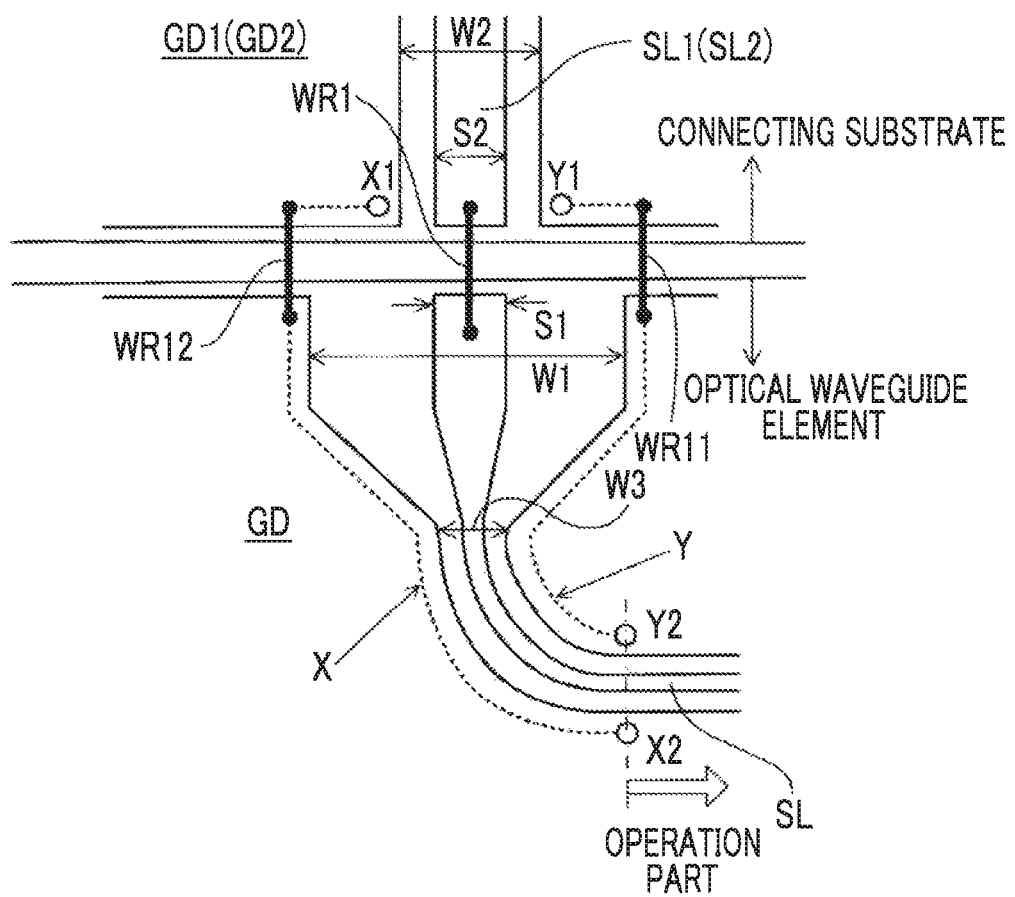
FIG. 2 is a view illustrating a connection state between an optical waveguide element and a connecting substrate in a case in which a space between ground electrodes which put a signal electrode in the optical waveguide element therebetween and a space between ground lines which put a signal line therebetween on the connecting substrate are different each other and, furthermore, a view illustrating a cause for the generation of a local potential difference between the ground electrodes in the curved section of the signal electrode.
Figure 3:
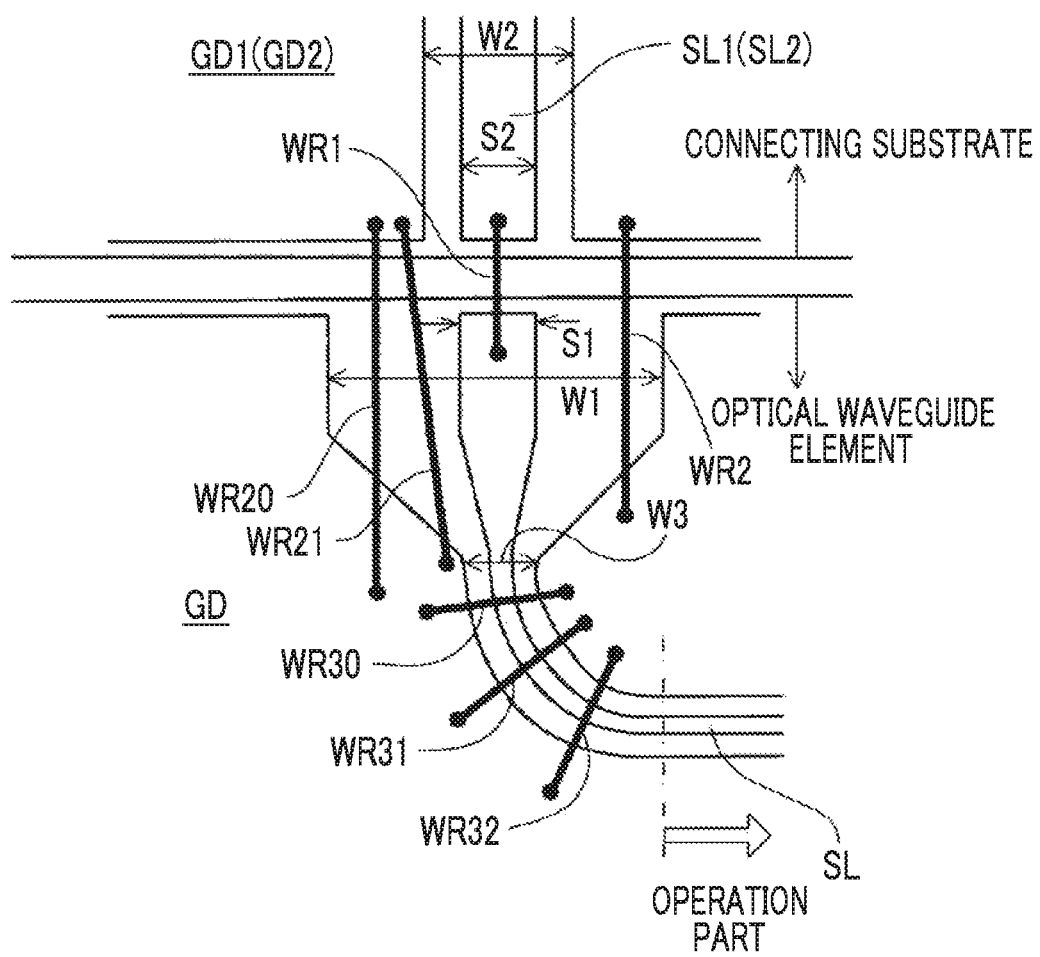
FIG. 3 is a view illustrating a wiring status of the optical waveguide element and the connecting substrate which are used in the optical-waveguide-element module of the present invention.

As illustrated in FIG. 2, the optical-waveguide-element module of the present invention is featured that an optical-waveguide-element module including an optical waveguide element including a substrate having an electro-optic effect, an optical waveguide formed in the substrate, and a control electrode for controlling light waves that propagate through the optical waveguide and a connecting substrate which is provided outside the optical waveguide element and has a wire electrically connected to the control electrode, the optical waveguide element and the connecting substrate being housed in a case, in which the control electrode is consisted of a signal electrode SL and ground electrodes GD which put the signal electrode therebetween, the connecting substrate is provided with a signal line SL1 (SL2) and ground lines GD1 (GD2) which put the signal line therebetween, the signal electrode and the signal line, and, the ground electrodes and the ground lines are respectively connected each other using wires (WR1, WR2, and WR20 and 21), the control electrode in which a space W1 between the ground electrodes GD at an input end or an output end in the control electrode is wider than a space W2 between the ground lines GD1 (GD2) at the optical waveguide element side of the connecting substrate, has a portion in which the space between the ground electrodes GD forms a space W3 which is narrower than the space W2 in a portion away from the input end or the output end, furthermore, the signal electrode SL in the control electrode has a curved section in a place from the input end or the output end to an operating part in which the control electrode applies an electric field to the optical waveguide, and suppression means for suppressing generation of a local potential difference between the ground electrodes which put the signal electrode therebetween in the curved section of the signal electrode is provided.

For the substrate having an electro-optic effect, particularly, any single crystal such as $LiNbO_3$, $LiTaO_3$, or lead lanthanum zirconate titanate (PLZT) can be preferably used. Particularly, $LiNbO_3$ and $LiTaO_3$ which are frequently used in optical modulators are preferred. In addition, optical waveguide that are formed in the substrate are formed by, for example, thermally diffusing a high-refractive-index substance such as titanium (Ti) in a $LiNbO_3$ substrate (LN substrate). In addition, ridge type waveguide can also be produced by forming grooves on side surfaces of optical waveguide or forming optical waveguide portion to be thicker than the other substrate portion.

The control electrode is consisted of a signal electrode and ground electrodes and can be formed by forming an electrode pattern of Ti and Au on a substrate surface and carrying out a gold plating method or the like. Furthermore, if necessary, it is also possible to provide a buffer layer such as dielectric $SiO_2$ on the substrate surface after the formation of the optical waveguide.

In the present invention, the "connecting substrate" refers to a relay substrate that connects an input terminal through which input signals are input from the outside and a signal input portion of an optical waveguide element, a terminator which is connected to the output end of the signal electrode in the optical waveguide element and absorbs electrical signals using a resistor or the like in order to suppress reflection of electrical signals, or a terminal substrate which connects the output end and the output terminal of the signal electrode in the optical waveguide element, or the like. As a substrate material for the connecting substrate, a material having lower permittivity than substrate material for optical waveguide elements, for example, alumina or a semiconductor material is used. This is because this material contributes on broadening of the bandwidth of the optical waveguide element.

As wires that connect the optical waveguide element and the connecting substrate, gold wires or gold ribbons with a wide width can be used, and, particularly, a method for wire-bonding with gold wire is preferred as a wiring method for the two. In addition, the number of the wires is not limited to one, and it is also possible to connect in the vicinities of the same place using plural gold wires.

The optical-waveguide-element module of the present invention, as illustrated in FIG. 2, is featured that the signal electrode SL in the control electrode has a curved section in a place from the input end or the output end to the operating part in which the control electrode applies an electric field to the optical waveguide, and suppression means for suppressing generation of a local potential difference between the ground electrodes GD which put the signal electrode SL therebetween in the curved section of the signal electrode is provided.

Particularly, in a case in which the space between the ground lines and the space between the ground electrodes do not continuously and smoothly change as in a case in which the space W1 between the ground electrodes GD is wider than the space W2 between the ground lines GD1 (GD2), and a portion in which the space between the ground electrodes GD form the space W3 which is narrower than the space W2 is provided in a portion away from the input end or the output end, it becomes more difficult to suppress the generation of a local potential difference between the ground electrodes in the curved section of the signal electrode.

The suppression means for suppressing generation of a local potential difference between the ground electrodes in the curved section of the signal electrode is, as illustrated in FIG. 2, plural wires (WR30 to 32) connecting the ground electrodes GD which put the curved section of the signal electrode SL therebetween, and the respective wires (WR30 to 32) connecting the ground electrodes are disposed in accordance with the normal direction to the curved section of the signal electrode.

Due to the wires WR30 to 32, in the curved section of the signal electrode, the ground electrodes which put the signal electrode therebetween are wired so as to have the same potential at any time with respect to microwave signals that propagate through the signal electrode SL, and thus it is possible to suppress deterioration of the propagation characteristics of microwaves.

As other suppression means, there are cases in which wires connecting the ground electrodes GD and the ground lines (GD1 and GD2) are set so that the length of the wire WR20 that is connected to the ground electrode having a longer length of the ground electrode along the signal electrode in a place from the input end or the output end to the operating part in which the control electrode applies an electric field to the optical waveguide (the left ground electrode in FIG. 2) is longer than the length of the wire WR2 that is connected to the ground electrode having a shorter length.

In such a case, it becomes possible to suppress generation of a potential difference between the ground electrodes when microwave signals enter the curved section of the signal electrode even in a case in which the lengths of the ground electrodes along the signal electrode are different each other on both sides of the signal electrode.

Furthermore, as other suppression means, there are cases in which wires connecting the ground electrodes GD and the ground lines (GD1 and GD2) are disposed so that the wire WR21 that is connected to the ground electrode having a longer length of the ground electrode along the signal electrode in a place from the input end or the output end to the operating part in which the control electrode applies an electric field to the optical waveguide is closer to the signal electrode SL than the wire WR2 that is connected to the ground electrode having a shorter length.

With the above-described configuration as well, it becomes possible to suppress generation of a potential difference between the ground electrodes when microwave signals enter the curved section of the signal electrode even in a case in which the lengths of the ground electrodes along the signal electrode are different each other on both sides of the signal electrode. It is needless to say that the above-described suppression means can be used in combination.

INDUSTRIAL APPLICABILITY

As described above, according to the preset invention, it becomes possible to provide an optical-waveguide-element module which enables a common connecting substrate to be used for different optical waveguide elements and suppresses deterioration of the propagation characteristics of electrical signals in a curved section of a signal electrode.

REFERENCE SIGNS LIST

1 OPTICAL WAVEGUIDE ELEMENT
2 CASE
CN1, CN2 CONNECTOR
CP1, CP2 CONNECTING SUBSTRATE
GD GROUND ELECTRODE
GD1, GD2 GROUND LINE
SL SIGNAL ELECTRODE
SL1, SL2 SIGNAL LINE
WR, WR1 TO 32 WIRE

The invention claimed is:

1. An optical waveguide element module comprising:
an optical waveguide element including a substrate having an electro-optic effect, an optical waveguide formed in the substrate, and a control electrode for controlling light waves that propagate through the optical waveguide; and
a connecting substrate which is provided outside the optical waveguide element and has a wire electrically connected to the control electrode,
the optical waveguide element and the connecting substrate being housed in a case,
wherein the control electrode comprises a signal electrode and ground electrodes having the signal electrode therebetween,
the connecting substrate is provided with a signal line and ground lines having the signal line therebetween,
the signal electrode and the signal line, and, the ground electrodes and the ground lines, are respectively connected each other using wires,
the control electrode in which a space W1 between the ground electrodes at an input end or an output end in the control electrode is wider than a space W2 between the ground lines at the optical waveguide element side of the connecting substrate, has a portion in which the space between the ground electrodes forms a space W3 which is narrower than the space W2 in a portion away from the input end or the output end,
the signal electrode in the control electrode has a curved section in a place from the input end or the output end to an operating part in which the control electrode applies an electric field to the optical waveguide,
suppression means for suppressing generation of a local potential difference between the ground electrodes having the signal electrode therebetween in the curved section of the signal electrode are provided, and
the suppression means are innermost wires connecting the ground electrodes and the ground lines, a length of one of the innermost wires connected to the ground electrode having a longer length of the ground electrode along the signal electrode in a place from the input end or the output end to the operating part is set to be longer than a length of the other innermost wire connected to the ground electrode having a shorter length, and said one of the innermost wires is disposed closer to the signal electrode than the other innermost wire in the curved section of the signal electrode.

2. The optical-waveguide-element module according to claim 1,
wherein the suppression means has no wire connecting the ground electrodes having the curved section of the signal electrode therebetween.

3. The optical-waveguide-element module according to claim 1,
wherein the suppression means have a plurality of wires connecting the ground electrodes having the curved section of the signal electrode therebetween, the respective wires connecting the ground electrodes are disposed in a normal direction to the curved section of the signal electrode, and said one of the innermost wires does not extend across the wires connecting the ground electrodes.

* * * * *